(12) United States Patent
Dang et al.

(10) Patent No.: US 9,313,726 B2
(45) Date of Patent: Apr. 12, 2016

(54) METHOD AND APPARATUS FOR SEARCHING FOR NETWORK

(71) Applicant: Huawei Device Co., Ltd., Shenzhen, Guangdong (CN)

(72) Inventors: Shujun Dang, Beijing (CN); Xiaoyan Duan, Beijing (CN); Hui Jin, Beijing (CN); Jian Wang, Beijing (CN); Xiaoyan Chen, Wuhan (CN); Yinqing Jiang, Wuhan (CN); Yongtao Fa, Shenzhen (CN); Xiaojian Liu, Wuhan (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/523,543

(22) Filed: Oct. 24, 2014

(65) Prior Publication Data

US 2015/0094058 A1    Apr. 2, 2015

Related U.S. Application Data

(63) Continuation of application No. PCT/CN2013/084621, filed on Sep. 29, 2013.

(51) Int. Cl.
*H04W 48/16* (2009.01)
*H04W 84/04* (2009.01)
*H04W 48/02* (2009.01)

(52) U.S. Cl.
CPC ............ *H04W 48/16* (2013.01); *H04W 84/042* (2013.01); *H04W 48/02* (2013.01)

(58) Field of Classification Search
CPC .... H04W 48/16; H04W 84/042; H04W 48/02
USPC ............................................. 455/434, 435.1
See application file for complete search history.

(56) References Cited

U.S. PATENT DOCUMENTS 5,839,069 A    11/1998  Keshavachar et al.
6,826,414 B1 *  11/2004  Reynolds et al. ............. 455/555
(Continued)

FOREIGN PATENT DOCUMENTS

CN    101494925 A    7/2009
CN    101674635 A    3/2010
(Continued)

OTHER PUBLICATIONS

"3rd Generation Partnership Project; Technical Specification Group Core Network and Terminals; Non-Access-Stratum (NAS) functions related to Mobile Station (MS) in idle mode (Release 12)", 3GPP TS 23.122 V12.2.0, Sep. 2013, 45 pages.
(Continued)

*Primary Examiner* — Leon Flores

(57) ABSTRACT

The present invention discloses a method and an apparatus for searching for a network. The method includes: determining that a user equipment (UE) camping on a cell of a current public land mobile network (PLMN) is in an access barred state; determining that the UE cannot be successfully registered with the current PLMN; and performing a PLMN search. In the method and the apparatus for searching for a network according to embodiments of the present invention, if it is determined that the UE normally camping on the cell of the current PLMN is in the access barred state and cannot be successfully registered with the current PLMN, the PLMN search is performed, so that when the UE is in the access barred state, the UE can still perform the PLMN search, and can further select a new PLMN for access and execute a normal service, thereby improving user experience.

12 Claims, 4 Drawing Sheets

(56) References Cited

U.S. PATENT DOCUMENTS

| | | |
|---|---|---|
| 2005/0227720 A1 | 10/2005 | Gunaratnam et al. |
| 2009/0131051 A1 | 5/2009 | Zhang et al. |
| 2009/0298459 A1* | 12/2009 | Saini et al. ................ 455/404.1 |
| 2010/0075658 A1* | 3/2010 | Hou et al. .................. 455/422.1 |
| 2010/0323662 A1* | 12/2010 | Dahlen et al. ................ 455/410 |
| 2011/0143703 A1 | 6/2011 | Seo et al. |
| 2011/0177810 A1 | 7/2011 | Kim |
| 2013/0064176 A1 | 3/2013 | Hsu et al. |
| 2015/0079938 A1* | 3/2015 | Jung et al. .................... 455/411 |

FOREIGN PATENT DOCUMENTS

| | | |
|---|---|---|
| CN | 101932048 A | 12/2010 |
| CN | 103037471 A | 4/2013 |
| CN | 103765958 A | 4/2014 |
| WO | WO 2009/046133 A1 | 4/2009 |
| WO | WO 2011/127086 A1 | 10/2011 |

OTHER PUBLICATIONS

"3rd Generation Partnership Project; Technical Specification Group Radio Access Network; User Equipment (UE) procedures in idle mode and procedures for cell reselection in connected mode (Release 11)", 3GPP TS 25.304 V11.4.0, Sep. 2013, 53 pages.

\* cited by examiner

METHOD AND APPARATUS FOR SEARCHING FOR NETWORK

CROSS-REFERENCE TO RELATED APPLICATIONS

This application is a continuation of International Application No. PCT/CN2013/084621, filed on Sep. 29, 2013, which is hereby incorporated by reference in its entirety.

TECHNICAL FIELD

Embodiments of the present invention relate to the field of communications, and more specifically, to a method and an apparatus for searching for a network.

BACKGROUND

Currently, mobile communications is a communications manner widely used around the world. A user equipment (User Equipment, "UE" for short) (for example, a mobile phone) needs to first select a public land mobile network (Public Land Mobile Network, "PLMN" for short), camp on a cell of the PLMN, and complete network registration, and then can execute a normal call or session service, for example, a voice call or data transmission. Generally, to better manage and control a mobile communications network (for example, access of a user is limited when a network is congested, and some networks for special purposes only allow access of a specific user), an operator needs to perform access control (Access Control, "AC" for short) on a user equipment. Specifically, the operator may set multiple access control classes (Access Control Class, "ACC" for short), and limit execution of part or all of normal services by some UEs belonging to an AAC of a lower access priority.

When a UE normally camps on a cell of a PLMN, if the UE is in an access barred state, that is, the UE belongs to an ACC in which access is limited, the UE performs only a cell search in the current PLMN, but does not perform a PLMN search, that is, does not select and access a new PLMN. However, when the UE moves to a coverage area of a new PLMN and meanwhile, is still in a strong signal area of the current PLMN, because the UE performs the cell search only in the current PLMN, even though the new PLMN can provide normal services such as call and data services for the UE, the UE still cannot select the new PLMN and further, cannot execute a normal call or session service, resulting in poor user experience.

SUMMARY

Embodiments of the present invention provide a method and an apparatus for searching for a network, so that when a user equipment UE is in an access barred state, the user equipment UE can still perform a PLMN search.

According to a first aspect, a method for searching for a network is provided, including: determining that a user equipment UE camping on a cell of a current public land mobile network PLMN is in an access barred state; determining that the UE cannot be successfully registered with the current PLMN; and performing a PLMN search.

With reference to the first aspect, in a first possible implementation manner, before the performing a PLMN search, the method further includes: determining whether the current PLMN is a normal PLMN, where the normal PLMN includes: a registered public land mobile network RPLMN with which the UE is previously successfully registered, a home public land mobile network HPLMN of the UE or an equivalent home public land mobile network EHPLMN of the UE; and the performing a PLMN search includes: if it is determined that the current PLMN is not the normal PLMN, performing the PLMN search.

With reference to the first aspect or with reference to the first possible implementation manner of the first aspect, in a second possible implementation manner, before the performing a PLMN search, the method further includes: starting a timer; and the performing a PLMN search includes: if the timer times out and the UE is still in the access barred state, performing the PLMN search.

With reference to the first aspect or with reference to the first or second possible implementation manner of the first aspect, in a third possible implementation manner, the performing a PLMN search includes: performing the PLMN search by using a manner in which a shortest PLMN search period is used as a start point and a PLMN search period is gradually extended, where the shortest PLMN search period is shorter than a PLMN search period that is used when the UE can execute a normal service; or performing the PLMN search by using a search period shorter than a PLMN search period that is used when the UE can execute a normal service.

With reference to the first aspect or with reference to any possible implementation manner of the first to third possible implementation manners of the first aspect, in a fourth possible implementation manner, the determining that the UE cannot be successfully registered with the current PLMN includes: if the UE cannot send a location registration request to the current PLMN, determining that the UE cannot be successfully registered with the current PLMN; or if the current PLMN rejects a location registration request sent by the UE, determining that the UE cannot be successfully registered with the current PLMN.

With reference to the first aspect or with reference to any possible implementation manner of the first to fourth possible implementation manners of the first aspect, in a fifth possible implementation manner, after the performing a PLMN search, the method further includes: selecting a target PLMN from at least one found PLMN; registering with the target PLMN; and executing a normal service in the target PLMN.

According to a second aspect, another method for searching for a network is provided, including: determining that a user equipment UE camping on a cell of a current public land mobile network PLMN is in an access barred state; switching to a limited service state; and performing a PLMN search.

With reference to the second aspect, in a first possible implementation manner, before the switching to a limited service state, the method further includes: determining that the current PLMN is not a home public land mobile network HPLMN of the UE and the PLMN is not an equivalent home public land mobile network EHPLMN of the UE, and determining that the UE is not in a normal roaming state; and the switching to a limited service state includes: if the current PLMN is neither the HPLMN of the UE nor the EHPLMN of the UE and the UE is not in the normal roaming state, switching to the limited service state.

With reference to the first possible implementation manner of the second aspect, in a second possible implementation manner, the determining that the UE is not in a normal roaming state includes determining that the UE is not in the normal roaming state if at least one of the following cases exists: The UE cannot be successfully registered with the current PLMN, the current PLMN is not a registered public land mobile network RPLMN with which the UE is previously successfully registered, a PLMN selector list of the UE does not include the current PLMN, the UE is not in a roaming state, roaming configuration information of the UE does not include information about the current PLMN, or a network type of the current PLMN is not a type of a network in which the UE can normally roam.

With reference to the second aspect or with reference to the first or second possible implementation manner of the second aspect, in a third possible implementation manner, before the switching to a limited service state, the method further includes: starting a timer; and the switching to a limited service state includes: if the timer times out and the UE is still in the access barred state, switching to the limited service state.

With reference to the second aspect or with reference to any possible implementation manner of the first to third possible implementation manners of the second aspect, in a fourth possible implementation manner, the performing a PLMN search includes: performing the PLMN search by using a manner in which a shortest PLMN search period is used as a start point and a PLMN search period is gradually extended, where the shortest PLMN search period is shorter than a PLMN search period that is used when the UE can execute a normal service; or performing the PLMN search by using a search period shorter than a PLMN search period that is used when the UE can execute a normal service.

With reference to the second aspect or with reference to any possible implementation manner of the first to fourth possible implementation manners of the second aspect, in a fifth possible implementation manner, after the performing a PLMN search, the method further includes: selecting a target PLMN from at least one found PLMN; registering with the target PLMN; and executing a normal service in the target PLMN.

According to a third aspect, a user equipment UE camping on a cell of a current public land mobile network PLMN is provided, including: a determining module, configured to determine that the UE is in an access barred state, and determine that the UE cannot be successfully registered with the current PLMN; and a searching module, configured to perform a PLMN search according to a result of determining of the determining module.

With reference to the third aspect, in a first possible implementation manner, the determining module is further configured to: before the searching module performs the PLMN search, determine whether the current PLMN is a normal PLMN, where the normal PLMN includes: a registered public land mobile network RPLMN with which the UE is previously successfully registered, a home public land mobile network HPLMN of the UE or an equivalent home public land mobile network EHPLMN of the UE; and the searching module is specifically configured to: if the determining module determines that the current PLMN is not the normal PLMN, perform the PLMN search.

With reference to the third aspect or with reference to the first possible implementation manner of the third aspect, in a second possible implementation manner, the UE further includes: a timing module, configured to start a timer before the searching module performs the PLMN search; and the searching module is specifically configured to: if the timer started by the timing module times out and the UE is still in the access barred state, perform the PLMN search.

With reference to the third aspect or with reference to the first or second possible implementation manner of the third aspect, in a third possible implementation manner, the searching module is specifically configured to perform the PLMN search by using a manner in which a shortest PLMN search period is used as a start point and a PLMN search period is gradually extended, where the shortest PLMN search period is shorter than a PLMN search period that is used when the UE can execute a normal service; or the searching module is specifically configured to perform the PLMN search by using a search period shorter than a PLMN search period that is used when the UE can execute a normal service.

With reference to the third aspect or with reference to any possible implementation manner of the first to third possible implementation manners of the third aspect, in a fourth possible implementation manner, the determining module is specifically configured to: if the UE cannot send a location registration request to the current PLMN, determine that the UE cannot be successfully registered with the current PLMN; or the determining module is specifically configured to: if the current PLMN rejects a location registration request sent by the UE, determine that the UE cannot be successfully registered with the current PLMN.

With reference to the third aspect or with reference to any possible implementation manner of the first to fourth possible implementation manners of the third aspect, in a fifth possible implementation manner, the UE further includes: a selecting module, configured to select a target PLMN from at least one PLMN found after the searching module performs the PLMN search; a registration module, configured to register with the target PLMN selected by the selecting module; and a service executing module, configured to execute a normal service in the target PLMN with which the registration module registers.

According to a fourth aspect, another user equipment UE camping on a cell of a current public land mobile network PLMN is provided, including: a determining module, configured to determine that the UE is in an access barred state; a status switching module, configured to switch to a limited service state when the determining module determines that the UE is in the access barred state; and a searching module, configured to perform a PLMN search when the status switching module switches to the limited service state.

With reference to the fourth aspect, in a first possible implementation manner, the determining module is further configured to: before the status switching module switches to the limited service state, determine that the current PLMN is not a home public land mobile network HPLMN of the UE and the current PLMN is not an equivalent home public land mobile network EHPLMN of the UE, and determine that the UE is not in a normal roaming state; and the status switching module is further configured to: if the determining module determines that the current PLMN is neither the HPLMN of the UE nor the EHPLMN of the UE and the UE is not in the normal roaming state, switch to the limited service state.

With reference to the first possible implementation manner of the fourth aspect, in a second possible implementation manner, the determining module is specifically configured to determine that the UE is not in the normal roaming state if at least one of the following cases exists: The UE cannot be successfully registered with the current PLMN, the current PLMN is not a registered public land mobile network RPLMN with which the UE is previously successfully registered, a PLMN selector list of the UE does not include the current PLMN, the UE is not in a roaming state, roaming configuration information of the UE does not include information about the current PLMN, or a network type of the current PLMN is not a type of a network in which the UE can normally roam.

With reference to the fourth aspect or with reference to the first or second possible implementation manner of the fourth aspect, in a third possible implementation manner, the UE further includes: a timing module, configured to start a timer before the status switching module switches to the limited service state; and the status switching module is specifically configured to: if the timer started by the timing module times out and the UE is still in the access barred state, switch to the limited service state.

With reference to the fourth aspect or with reference to any possible implementation manner of the first to third possible implementation manners of the fourth aspect, in a fourth possible implementation manner, the searching module is specifically configured to perform the PLMN search by using a manner in which a shortest PLMN search period is used as a start point and a PLMN search period is gradually extended, where the shortest PLMN search period is shorter than a PLMN search period that is used when the UE can execute a normal service; or the searching module is specifically configured to perform the PLMN search by using a search period shorter than a PLMN search period that is used when the UE can execute a normal service.

With reference to the fourth aspect or with reference to any possible implementation manner of the first to fourth possible implementation manners of the fourth aspect, in a fifth possible implementation manner, the UE further includes: a selecting module, configured to select a target PLMN from at least one PLMN found after the searching module performs the PLMN search; a registration module, configured to register with the target PLMN selected by the selecting module; and a service executing module, configured to execute a normal service in the target PLMN with which the registration module registers.

According to a fifth aspect, a terminal device camping on a cell of a current public land mobile network PLMN is provided, including: a subscriber identity module, configured to store an access control class ACC of the terminal device; and a processor, configured to determine that the terminal device is in an access barred state according to system information of the current PLMN and the ACC of the terminal device stored in the subscriber identity module, where the processor is further configured to determine that the terminal device cannot be successfully registered with the current PLMN, and perform a PLMN search.

With reference to the fifth aspect, in a first possible implementation manner, the processor is further configured to: before performing the PLMN search, determine whether the current PLMN is a normal PLMN, where the normal PLMN includes: a registered public land mobile network RPLMN with which the terminal device is previously successfully registered, a home public land mobile network HPLMN of the terminal device or an equivalent home public land mobile network EHPLMN of the terminal device; and if it is determined that the current PLMN is not the normal PLMN, perform the PLMN search.

With reference to the fifth aspect or with reference to the first possible implementation manner of the fifth aspect, in a second possible implementation manner, the processor is further configured to: start a timer before performing the PLMN search; and if the timer times out and the terminal device is still in the access barred state, perform the PLMN search.

With reference to the fifth aspect or with reference to the first or second possible implementation manner of the fifth aspect, in a third possible implementation manner, the processor is specifically configured to perform the PLMN search by using a manner in which a shortest PLMN search period is used as a start point and a PLMN search period is gradually extended, where the shortest PLMN search period is shorter than a PLMN search period that is used when the terminal device can execute a normal service; or the processor is specifically configured to perform the PLMN search by using a search period shorter than a PLMN search period that is used when the terminal device can execute a normal service.

With reference to the fifth aspect or with reference to any possible implementation manner of the first to third possible implementation manners of the fifth aspect, in a fourth possible implementation manner, the processor is specifically configured to: if the terminal device cannot send a location registration request to the current PLMN, determine that the terminal device cannot be successfully registered with the current PLMN; or the processor is specifically configured to: if the current PLMN rejects a location registration request sent by the terminal device, determine that the terminal device cannot be successfully registered with the current PLMN.

With reference to the fifth aspect or with reference to any possible implementation manner of the first to fourth possible implementation manners of the fifth aspect, in a fifth possible implementation manner, the processor is further configured to: select a target PLMN from at least one PLMN found after performing the PLMN search; register with the target PLMN; and execute a normal service in the target PLMN.

According to a sixth aspect, another terminal device camping on a cell of a current public land mobile network PLMN is provided, including: a subscriber identity module, configured to store an access control class ACC of the terminal device; and a processor, configured to determine that the terminal device is in an access barred state according to system information of the current PLMN and the ACC of the terminal device stored in the subscriber identity module, where the processor is further configured to switch to a limited service state, and perform a PLMN search.

With reference to the sixth aspect, in a first possible implementation manner, the processor is further configured to: before switching to the limited service state, determine that the current PLMN is not a home public land mobile network HPLMN of the terminal device and the current PLMN is not an equivalent home public land mobile network EHPLMN of the terminal device, and determine that the terminal device is not in a normal roaming state; and if the current PLMN is neither the HPLMN of the terminal device nor the EHPLMN of the terminal device, and the terminal device is not in the normal roaming state, switch to the limited service state.

With reference to the first possible implementation manner of the sixth aspect, in a second possible implementation manner, the processor is specifically configured to determine that the terminal device is not in the normal roaming state if at least one of the following cases exists: The terminal device cannot be successfully registered with the current PLMN, the current PLMN is not a registered public land mobile network RPLMN with which the terminal device is previously successfully registered, a PLMN selector list of the terminal device does not include the current PLMN, the terminal device is not in a roaming state, roaming configuration information of the terminal device does not include information about the current PLMN, or a network type of the current PLMN is not a type of a network in which the terminal device can normally roam.

With reference to the sixth aspect or with reference to the first or second possible implementation manner of the sixth aspect, in a third possible implementation manner, the processor is further configured to: start a timer before switching to the limited service state; and if the timer times out and the terminal device is still in the access barred state, switch to the limited service state.

With reference to the sixth aspect or with reference to any possible implementation manner of the first to third possible implementation manners of the sixth aspect, in a fourth possible implementation manner, the processor is specifically configured to perform the PLMN search by using a manner in which a shortest PLMN search period is used as a start point and a PLMN search period is gradually extended, where the shortest PLMN search period is shorter than a PLMN search period that is used when the terminal device can execute a normal service; or the processor is specifically configured to perform the PLMN search by using a search period shorter than a PLMN search period that is used when the terminal device can execute a normal service.

With reference to the sixth aspect or with reference to any possible implementation manner of the first to fourth possible implementation manners of the sixth aspect, in a fifth possible implementation manner, the processor is further configured to: select a target PLMN from at least one PLMN found after performing the PLMN search; register with the target PLMN; and execute a normal service in the target PLMN.

Based on the foregoing technical solutions, in the method and the apparatus for searching for a network provided in the embodiments of the present invention, when it is determined that the UE normally camping on the cell of the current PLMN is in the access barred state and cannot be successfully registered with the current PLMN, the PLMN search is performed, so that when the UE is in the access barred state, the UE can still perform the PLMN search and can further select a new PLMN for access and execute the normal service, thereby improving user experience.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that the technical solutions according to the embodiments of the present invention may be applied to various communications systems, such as a Global System for Mobile Communications (Global System for Mobile Communications, "GSM" for short) system, a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short) system, a Long Term Evolution (Long Term Evolution, "LTE" for short) system, an LTE frequency division duplex (Frequency Division Duplex, "FDD" for short) system, an LTE time division duplex (Time Division Duplex, "TDD" for short) system, a Universal Mobile Telecommunications System (Universal Mobile Telecommunications System, "UMTS" for short), and a Worldwide Interoperability for Microwave Access (Worldwide Interoperability for Microwave Access, "WiMAX" for short) communications system.

It should further be understood that, in the embodiments of the present invention, a user equipment (User Equipment, "UE" for short) may be referred to as a terminal (Terminal), a mobile station (Mobile Station, "MS" for short), a mobile terminal (Mobile Terminal), and the like. The user equipment may communicate with one or more core networks by using a radio access network (Radio Access Network, "RAN" for short). For example, the user equipment may be a mobile phone (or referred to as a "cellular" phone), or a computer with a mobile terminal, and for example, the user equipment may further be a portable, pocket-sized, handheld, computer built-in, or vehicle-mounted mobile apparatus, which exchanges voice and/or data with the radio access network.

Figure 1:
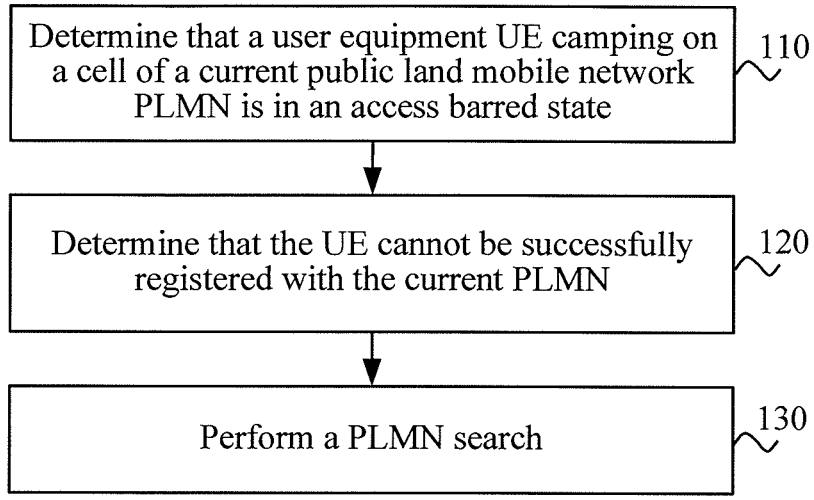
FIG. 1 is a schematic flowchart of a method for searching for a network according to an embodiment of the present invention.

FIG. 1 shows a schematic flowchart of a method 100 for searching for a network according to an embodiment of the present invention. The method 100 may be executed by any proper apparatus. For convenience of description, the following description uses an example in which the method 100 is executed by a user equipment UE, but the embodiment of the present invention is not limited thereto. As shown in FIG. 1, the method 100 includes:

S110: Determine that a user equipment UE camping on a cell of a current public land mobile network PLMN is in an access barred state.

S120: Determine that the UE cannot be successfully registered with the current PLMN.

S130: Perform a PLMN search.

Therefore, in the method for searching for a network according to the embodiment of the present invention, when it is determined that the UE normally camping on the cell of the current PLMN is in the access barred state and cannot be successfully registered with the current PLMN, the PLMN search is performed, so that when the UE is in the access barred state, the UE can still perform the PLMN search, and can further select a new PLMN for access and execute a normal service, thereby improving user experience.

In the embodiment of the present invention, the UE normally camps on the cell of the current PLMN; if the UE determines that the UE is in the access barred state, the UE may further determine whether the UE can be successfully registered with the current PLMN; and if the UE determines that the UE cannot be successfully registered with the current PLMN, the UE performs the PLMN search.

In the embodiment of the present invention, the UE normally camps on the cell of the current PLMN, and the current PLMN performs access control on a UE in a network. Optionally, the current PLMN may be a dedicated PLMN, for example, a PLMN configured to manage and control a specific communication artery, and may also be a general commercial PLMN, but the embodiment of the present invention is not limited thereto.

In S110, the UE determines that the UE is in the access barred state, where the "access barred state" indicates that the UE belongs to an ACC for which the UE is barred by the serving cell, which the UE currently camps on, from access, and therefore cannot execute a normal call or session service, for example, calling and data transmission. For example, if the current PLMN bars a UE belonging to a specific ACC from executing a calling service and the specific ACC includes the ACC to which the UE belongs, the UE cannot execute the calling service in the serving cell. Specifically, the UE may read access control information of the serving cell from system information broadcast by the serving cell, where the access control information indicates ACCs for which the access is allowed or barred, and then the UE determines whether the UE is in the access barred state according to the ACC to which the UE belongs. If the ACC to which the UE belongs is an ACC for which access control of the serving cell allows the access, the UE is in an access non-barred state; otherwise, the UE is in the access barred state. However, the embodiment of the present invention is not limited thereto. Optionally, the ACC to which the UE belongs may be stored in a subscriber identity module of the UE, for example, a subscriber identity module (Subscriber Identity Module, "SIM" for short) or a universal subscriber identity module (Universal Subscriber Identity Module, "USIM" for short), where the SIM or the USIM may be implemented by means of hardware, and may also be implemented by means of software, which is not limited in the embodiment of the present invention.

In S120, the UE may determine, in multiple manners, that the UE cannot be registered with the current PLMN. Optionally, the S120 of determining that the UE cannot be successfully registered with the current PLMN includes:

condition 1: If the UE cannot send a location registration request to the current PLMN, determine that the UE cannot be successfully registered with the current PLMN; or condition 2: If the current PLMN rejects a location registration request sent by the UE, determine that the UE cannot be successfully registered with the current PLMN.

In condition 1, the UE may determine, according to access control configuration of the current PLMN and the ACC to which the UE belongs, that the UE cannot send the location registration request to the current PLMN, but the embodiment of the present invention is not limited thereto.

Figure 2:
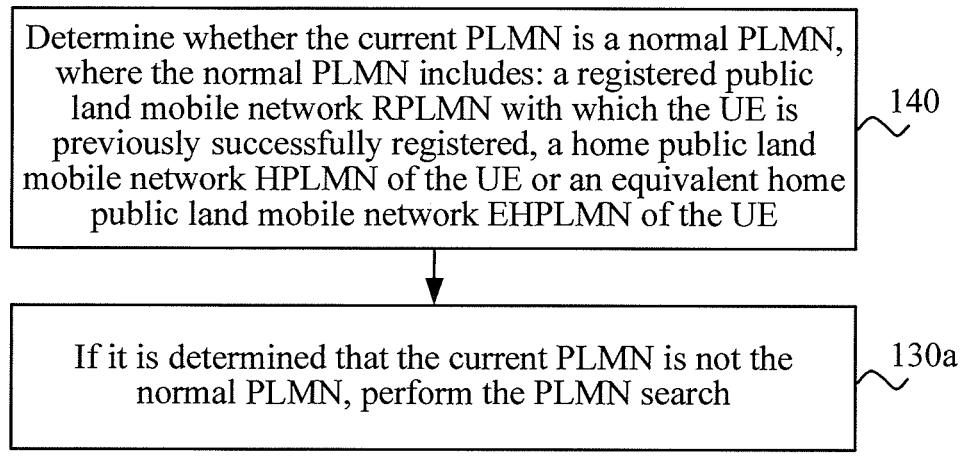
FIG. 2 is another schematic flowchart of a method for searching for a network according to an embodiment of the present invention.

Optionally, as another embodiment, as shown in FIG. 2, before S130, the method 100 further includes:

S140: Determine whether the current PLMN is a normal PLMN, where the normal PLMN includes: a registered public land mobile network RPLMN with which the UE is previously successfully registered, a home public land mobile network HPLMN of the UE or an equivalent home public land mobile network EHPLMN of the UE.

Correspondingly, the S130 of perform a PLMN search includes:

S130a: If it is determined that the current PLMN is not the normal PLMN, perform the PLMN search.

The UE may store a registered public land mobile network (Registered PLMN, "RPLMN" for short) with which the UE has been successfully registered, where the RPLMN may refer to all PLMNs with which the UE is successfully registered in a recent period of time, may include a PLMN with which the UE is successfully registered last time, and may also include a PLMN with which the UE is successfully registered at an earlier time, but the embodiment of the present invention is not limited thereto.

In S130a, if the UE determines that the current PLMN is none of the RPLMN of the UE, an HPLMN of the UE and an EHPLMN of the UE, the UE performs the PLMN search; if the current PLMN is a normal PLMN, that is, the current PLMN is at least one of the RPLMN of the UE, the HPLMN of the UE and the EHPLMN of the UE, the UE may execute a cell reselection process. However, the embodiment of the present invention is not limited thereto.

Figure 3:
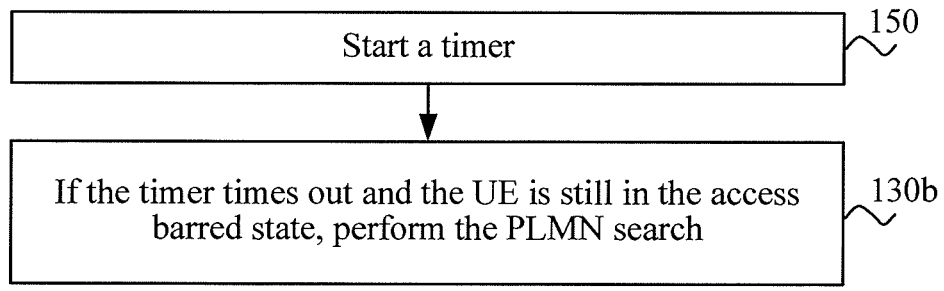
FIG. 3 is yet another schematic flowchart of a method for searching for a network according to an embodiment of the present invention.

Optionally, as another embodiment, as shown in FIG. 3, before S130, the method 100 further includes:

S150: Start a timer.

Correspondingly, the S130 of performing a PLMN search includes:

S130b: If the timer times out and the UE is still in the access barred state, perform the PLMN search.

The timer may be an access barred timer (Access Barred Timer), and the timer may have preset duration. When the UE receives a system message broadcast by the current PLMN before the timer times out, the UE may determine whether the UE is still in the access barred state according to access control information in the system message. If the UE has not been in the access barred state before the timer times out, for example, the UE has switched to a state in which a normal service can be executed or has switched to a limited service state, the UE may perform the PLMN search in the limited service state, or execute the normal service in the state in which all normal services can be executed. If the UE is still in the access barred state when the timer times out, the UE may perform the PLMN search by performing a subsequent step. However, the embodiment of the present invention is not limited thereto.

In the embodiment of the present invention, optionally, the UE may further switch to the limited service state before performing the PLMN search, but the embodiment of the present invention is not limited thereto.

Optionally, S140 and S150 may be performed at the same time, and may also be performed in any sequence, which is not limited in the embodiment of the present invention.

The UE may perform the PLMN search by using multiple manners. Optionally, the performing the PLMN search in S130 or S130a or S130b includes:

condition 3: Perform the PLMN search by using a manner in which a shortest PLMN search period is used as a start point and a PLMN search period is gradually extended, where the shortest PLMN search period is shorter than a PLMN search period that is used when the UE can execute a normal service; or condition 4: Perform the PLMN search by using a search period shorter than a PLMN search period that is used when the UE can execute a normal service.

In condition 3, the shortest PLMN search period refers to a PLMN search period that has a smallest period and is used when the UE performs the PLMN search, and the UE starts to perform the PLMN search by using the shortest PLMN search period as the start point, where the shortest PLMN search period may be preset, but the embodiment of the present invention is not limited thereto. Optionally, the UE may gradually increase the PLMN search period by using a fixed step length, and may also increase the PLMN search period by using a manner of an arithmetic progression, such as a PLMN search period of 2 minutes, 6 minutes, or 12 minutes in sequence; and the UE may also increase the PLMN search period by using a manner of an exponent, for example, 2 minutes, 4 minutes, or 8 minutes, until a PLMN is found. Optionally, the UE may also go back to the shortest PLMN search period when the PLMN search period is increased to a preset maximum PLMN search period (for example, 1 hour), and perform the PLMN search by using the foregoing manner of gradually increasing the PLMN search period, but the embodiment of the present invention is not limited thereto.

In condition 4, the UE performs the PLMN search by using a fixed PLMN search period, and the PLMN search period is shorter than the PLMN search period that is used when the UE can execute the service (that is, execution of the normal service is allowed by the current PLMN for an ACC to which the UE belongs). For example, if the PLMN search period that is used when the UE can execute the normal service is 1 hour, the PLMN search period that is used by the UE in S132 may be 10 minutes, so that the UE can find a proper PLMN more quickly, but the embodiment of the present invention is not limited thereto.

Figure 4:
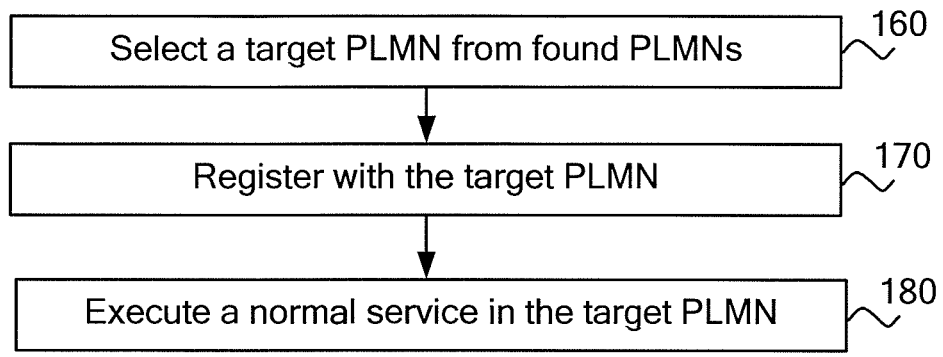
FIG. 4 is yet another schematic flowchart of a method for searching for a network according to an embodiment of the present invention.

Optionally, as another embodiment, as shown in FIG. 4, the method 100 further includes:

S160: Select a target PLMN from at least one PLMN found.

S170: Register with the target PLMN.

S180: Execute a normal service in the target PLMN.

Therefore, in the method for searching for a network according to the embodiments of the present invention, when it is determined that the UE normally camping on the cell of the current PLMN is in the access barred state and cannot be successfully registered with the current PLMN, the PLMN search is performed, so that when the UE is in the access barred state, the UE can still perform the PLMN search, and can further select a new PLMN for access and execute the normal service, thereby improving user experience. In addition, the search period that is used when the UE performs the PLMN search is shorter than the PLMN search period that is used when the UE can execute the normal service, so that the UE performs the PLMN search more quickly, and can further select a proper PLMN for access more quickly and execute the normal service, thereby further improving the user experience.

Figure 5:
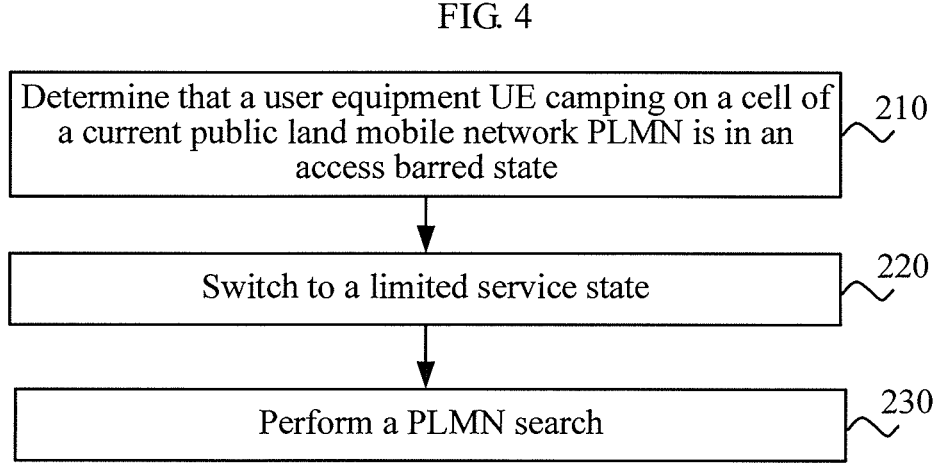
FIG. 5 is a schematic flowchart of a method for searching for a network according to another embodiment of the present invention.

FIG. 5 shows a schematic flowchart of a method 200 for searching for a network according to another embodiment of the present invention. The method may be executed by any proper apparatus. For convenience of description, the following description uses an example in which the method is executed by a UE, but the embodiment of the present invention is not limited thereto. As shown in FIG. 5, the method 200 includes:

S210: Determine that a user equipment UE camping on a cell of a current public land mobile network PLMN is in an access barred state.

S220: Switch to a limited service state.

S230: Perform a PLMN search.

Therefore, in the method for searching for a network according to the embodiment of the present invention, if it is determined that the UE normally camping on the cell of the current PLMN is in the access barred state, the UE switches to the limited service state and performs the PLMN search in the limited service state, so that the UE can perform the PLMN search when the UE is in the access barred state, and can further select a new PLMN for access and execute a normal service, thereby improving user experience.

In the embodiment of the present invention, the UE normally camps on the cell of the current PLMN, and the current PLMN performs access control on a UE in a network. Optionally, the current PLMN may be a dedicated PLMN, for example, a PLMN configured to manage and control a specific communication artery, and may also be a general commercial PLMN, but the embodiment of the present invention is not limited thereto.

In S210, the UE determines that the UE is in the access barred state, where the "access barred state" indicates that the UE belongs to an ACC for which the UE is barred by the serving cell, which the UE currently camps on, from access, and therefore cannot execute a normal call or session service, for example, calling and data transmission. For example, if the current PLMN bars a UE belonging to a specific ACC from executing a calling service and the specific ACC includes the ACC to which the UE belongs, the UE cannot execute the calling service in the serving cell. Specifically, the UE may read access control information of the serving cell from system information broadcast by the serving cell, where the access control information indicates ACCs for which the access is allowed or barred, and then the UE determines whether the UE is in the access barred state according to the ACC to which the UE belongs. If the ACC to which the UE belongs is an ACC for which access control of the serving cell allows the access, the UE is in an access non-barred state; otherwise, the UE is in the access barred state. However, the embodiment of the present invention is not limited thereto. Optionally, the ACC to which the UE belongs may be stored in a subscriber identity module of the UE, for example, a SIM or a USIM, where the SIM or the USIM may be implemented by means of hardware, and may also be implemented by means of software, which is not limited by the embodiment of the present invention.

In S220, the UE switches from the access barred state to the limited service state. Specifically, a mobile management module (or referred to as a mobile management sub-layer) of the UE enters the limited service state (Limited Service State) from the normal service state (Normal Service State). The limited service state is a special service state of a user equipment in a mobile communications network; in the limited service state, the UE can only make an emergency call (for example, calling a public security department for help in case of danger), and cannot execute a normal call or data service.

Figure 6:
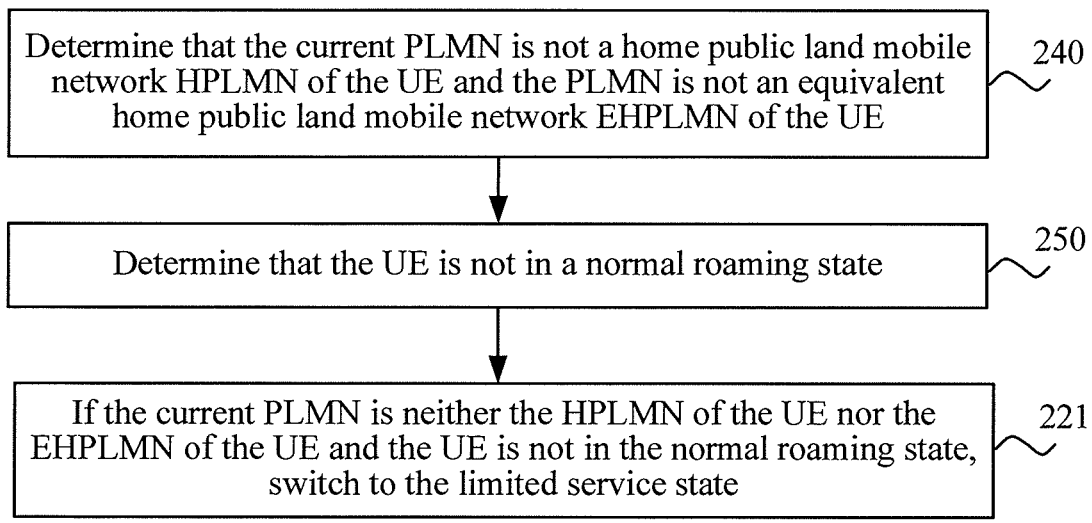
FIG. 6 is another schematic flowchart of a method for searching for a network according to another embodiment of the present invention.

Optionally, as shown in FIG. 6, before S220, the method 200 further includes:

S240: Determine that the current PLMN is not a home public land mobile network HPLMN of the UE and the PLMN is not an equivalent home public land mobile network EHPLMN of the UE.

S250: Determine that the UE is not in a normal roaming state.

Correspondingly, the S220 of switching to a limited service state includes:

S221: If the current PLMN is neither the HPLMN of the UE nor the EHPLMN of the UE and the UE is not in the normal roaming state, switch to the limited service state.

Optionally, the UE may perform S240 and S250 at the same time, and may also perform S240 and S250 in any sequence, which is not limited in the embodiment of the present invention. In S250, the UE determines that the UE is not in the normal roaming state. Specifically, the UE may determine that the UE is not in a normal international roaming state and/or not in a normal national roaming state. If the UE determines that the current PLMN is the HPLMN of the UE or the UE determines that the current PLMN is the EHPLMN of the UE or the UE determines that the UE is in the normal roaming state, the UE may perform a cell reselection process, which is not limited in the embodiment of the present invention.

The UE may determine whether the UE is in the normal roaming state by using multiple manners. Optionally, the S250 of determining that the UE is not in a normal roaming state includes:

S251: Determine that the UE is not in the normal roaming state if at least one of the following cases exists: The UE cannot be successfully registered with the current PLMN, the current PLMN is not a registered public land mobile network RPLMN with which the UE is previously successfully registered, a PLMN selector list of the UE does not include the current PLMN, the UE is not in a roaming state, roaming configuration information of the UE does not include information about the current PLMN, or a network type of the current PLMN is not a type of a network in which the UE can normally roam.

Specifically, the UE may determine whether the UE can be successfully registered with the current PLMN by determining whether the UE can send a location registration request to the current PLMN or whether the current PLMN rejects the location registration request sent by the UE. If the UE cannot send the location registration request to the current PLMN, or the UE can send the location registration request to the current PLMN but the current PLMN rejects the location registration request sent by the UE, the UE may determine that the UE cannot be successfully registered with the current PLMN. If the UE can be successfully registered with the current PLMN, the UE may determine that the UE is in the normal roaming state; otherwise, the UE may determine that the UE is not in the normal roaming state. The UE may also determine whether the UE is in the normal roaming state further according to other information. However, the embodiment of the present invention is not limited thereto.

The RPLMN with which the UE is previously successfully registered may refer to all PLMNs with which the UE is successfully registered in a recent period of time, may include a PLMN with which the UE is successfully registered last time, and may also include a PLMN with which the UE is successfully registered at an earlier time, but the embodiment of the present invention is not limited thereto.

The PLMN selector list of the UE may be a user controlled PLMN selector (user controlled PLMN selector) list of the UE, and may also be an operator controlled PLMN selector (operator controlled PLMN selector) list of the UE. If the PLMN selector list of the UE includes the current PLMN, the UE may determine that the UE is in the normal roaming state; otherwise, the UE may determine that the UE is not in the normal roaming state. The UE may also determine whether the UE is in the normal roaming state further according to other information. However, the embodiment of the present invention is not limited thereto.

By requesting a user to determine whether the UE is currently in the roaming state or whether a roaming service has been enabled for the UE, the UE may further determine whether the roaming service has been enabled for the UE or whether the UE is in the roaming state, or the UE may determine whether the UE is in the normal roaming state according to roaming configuration information of the UE, but the embodiment of the present invention is not limited thereto.

Optionally, the UE may obtain the network type of the current PLMN by receiving a "network type" field included in a broadcast message of the current PLMN, the network type of the PLMN may also preset in the UE by using manners such as device management (Device Management, "DM" for short) and over the air (Over the air, "OTA" for short), and the embodiment of the present invention is not limited thereto.

The network type of the PLMN may include a type such as a "public network" or a "dedicated network". Optionally, if the network type of the current PLMN is the "public network", the UE may determine that the UE is in the normal roaming state; otherwise, the UE may determine that the UE is not in the normal roaming state. However, the embodiment of the present invention is not limited thereto.

Figure 7:
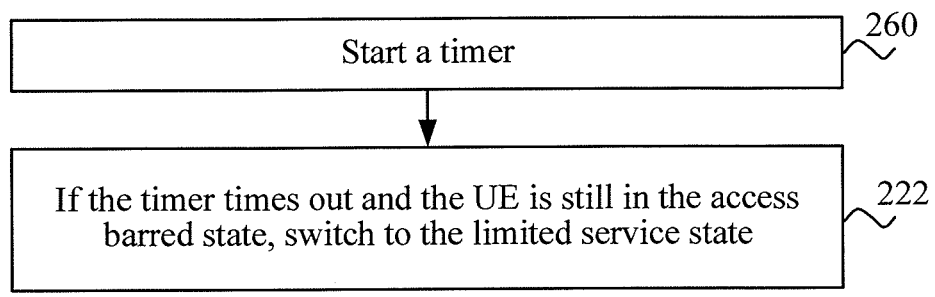
FIG. 7 is yet another schematic flowchart of a method for searching for a network according to another embodiment of the present invention.

Optionally, as another embodiment, as shown in FIG. 7, before S220, the method 200 further includes:

S260: Start a timer.

Correspondingly, the S220 of switching to a limited service state includes:

S222: If the timer times out and the UE is still in the access barred state, switch to the limited service state.

The timer may be an access barred timer (Access Barred Timer), and the timer may have preset duration. When the UE receives a broadcast message of the current PLMN before the timer times out, the UE may determine whether the UE is still in the access barred state according to access control information in the broadcast message. If the UE has not been in the access barred state before the timer times out, for example, the UE has switched to a state in which a normal service can be executed or has switched to the limited service state, the UE may perform the PLMN search in the limited service state, or execute the normal service in the state in which the normal service can be executed. If the UE is still in the access barred state when the timer times out, the UE may perform the PLMN search by performing a subsequent step. However, the embodiment of the present invention is not limited thereto.

Optionally, S250 and S260 may be performed at the same time, and may also be performed in any sequence; if the UE is still in the access barred state when the timer times out, the UE determines that the UE is not in the normal roaming state, and the current PLMN is neither the HPLMN of the UE nor the EHPLMN of the UE, the UE switches to the limited service state. However, the embodiment of the present invention is not limited thereto.

Optionally, as another embodiment, the S230 of performing a PLMN search includes:

S231: Perform the PLMN search by using a manner in which a shortest PLMN search period is used as a start point and a PLMN search period is gradually extended, where the shortest PLMN search period is shorter than a PLMN search period that is used when the UE can execute a normal service; or S232: Perform the PLMN search by using a search period shorter than a PLMN search period that is used when the UE can execute a normal service.

In S231, the UE may gradually increase the PLMN search period by using a fixed step length, and may also increase the PLMN search period by using a manner of an arithmetic progression, such as a PLMN search period of 2 minutes, 6 minutes, or 12 minutes in sequence; and the UE may also increase the PLMN search period by using a manner of an exponent, for example, 2 minutes, 4 minutes, or 8 minutes, until a PLMN is found. Optionally, the UE may also go back to the shortest PLMN search period when the PLMN search period is increased to a preset threshold (for example, 1 hour), and perform the PLMN search by using the foregoing manner of gradually increasing the PLMN search period, but the embodiment of the present invention is not limited thereto.

In S232, the UE performs the PLMN search by using a fixed PLMN search period, and the PLMN search period is shorter than the PLMN search period that is used when the UE can execute the normal service (that is, execution of the normal service is allowed by the current PLMN for an ACC to which the UE belongs). For example, if the PLMN search period that is used when the UE can execute the normal service is 1 hour, the PLMN search period that is used by the UE in S232 may be 10 minutes, so that the UE can find a proper PLMN more quickly, but the embodiment of the present invention is not limited thereto.

Figure 8:
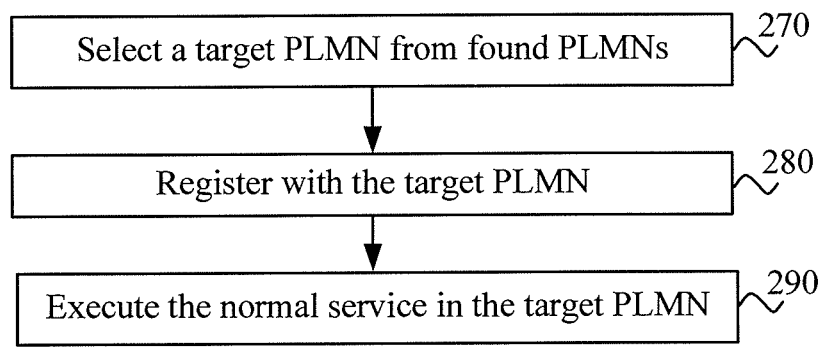
FIG. 8 is yet another schematic flowchart of a method for searching for a network according to another embodiment of the present invention.

Optionally, as another embodiment, as shown in FIG. 8, the method 200 further includes:

S270: Select a target PLMN from at least one PLMN found.

S280: Register with the target PLMN.

S290: Execute a normal service in the target PLMN.

Therefore, in the method for searching for a network according to the embodiment of the present invention, if it is determined that the UE normally camping on the cell of the current PLMN is in the access barred state, the UE switches to the limited service state and performs the PLMN search in the limited service state, so that when the UE is in the access barred state, the UE can perform the PLMN search, and can further select a new PLMN for access and execute the normal service, thereby improving user experience. In addition, the search period that is used when the UE performs the PLMN search is shorter than a PLMN search period that is used when the UE can execute all normal services, so that the UE performs the PLMN search more quickly, and can further select a proper PLMN for access more quickly and execute the normal service, thereby further improving the user experience.

It should be understood that sequence numbers of the foregoing processes do not mean execution sequences. The execution sequences of the processes should be determined according to functions and internal logic of the processes, and should not be construed as any limitation on the implementation processes of the embodiments of the present invention.

With reference to FIG. 1 to FIG. 8, the method for searching for a network according to the embodiments of the present invention is described above in detail. With reference to FIG. 9 to FIG. 16, a user equipment and a terminal device according to the embodiments of the present invention are described in the following.

Figures 9, 10:
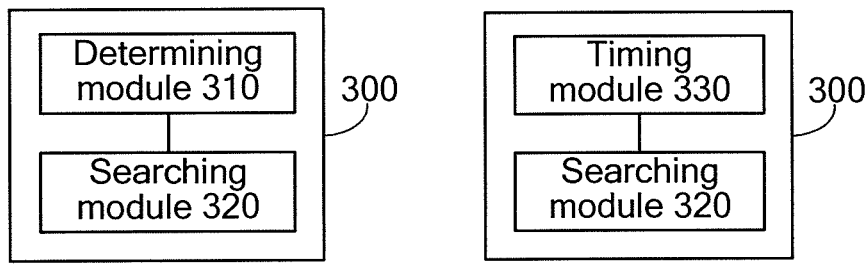
FIG. 9 is a schematic block diagram of a user equipment according to an embodiment of the present invention.
FIG. 10 is another schematic block diagram of a user equipment according to an embodiment of the present invention.

FIG. 9 shows a schematic block diagram of a user equipment UE 300 according to an embodiment of the present invention, where the UE 300 camps on a cell of a current public land mobile network PLMN. As shown in FIG. 9, the UE 300 includes:

a determining module 310, configured to determine that the UE 300 is in an access barred state, and determine that the UE 300 cannot be successfully registered with the current PLMN; and a searching module 320, configured to perform a PLMN search according to a result of determining of the determining module 310.

Therefore, for the UE according to the embodiment of the present invention, the UE normally camps on the cell of the current PLMN; if the UE determines that the UE is in the access barred state and cannot be successfully registered with the current PLMN, the UE performs the PLMN search, so that when the UE is in the access barred state, the UE can still perform the PLMN search, and can further select a new PLMN for access and execute a normal service, thereby improving user experience.

In the embodiment of the present invention, when the determining module 310 determines that the UE 300 is in the access barred state and determines that the UE 300 cannot be successfully registered with the current PLMN, the searching module 320 performs the PLMN search on the basis that the determining module 310 determines that the UE 300 is in the access barred state and the UE 300 cannot be successfully registered with the current PLMN.

Optionally, the determining module 310 is further configured to: before the searching module 320 performs the PLMN search, determine whether the current PLMN is a normal PLMN, where the normal PLMN includes: a registered public land mobile network RPLMN with which the UE 300 is previously successfully registered, a home public land mobile network HPLMN of the UE 300 or an equivalent home public land mobile network EHPLMN of the UE 300.

The searching module 320 is specifically configured to: if the determining module 310 determines that the current PLMN is not the normal PLMN, perform the PLMN search.

The UE 300 may store the RPLMN with which the UE 300 has been previously successfully registered, where the RPLMN may refer to all PLMNs with which the UE 300 is successfully registered in a recent period of time, may include a PLMN with which the UE 300 is successfully registered last time, and may also include a PLMN with which the UE 300 is successfully registered at an earlier time, but the embodiment of the present invention is not limited thereto.

Optionally, as another embodiment, as shown in FIG. 10, the UE 300 further includes:

a timing module 330, configured to start a timer before the searching module 320 performs the PLMN search; and the searching module 320 is specifically configured to: if the timer started by the timing module 330 times out and the UE 300 is still in the access barred state, perform the PLMN search.

The UE 300 may further include a receiving module, configured to receive a system message broadcast by the current PLMN. The determining module 310 may determine whether the UE 300 is still in the access barred state according to the system message received by the receiving module. If the determining module 310 determines that the UE 300 has not been in the access barred state before the timer times out, for example, the UE 300 has switched to a state in which a normal service can be executed or has switched to a limited service state, the UE 300 may perform the PLMN search in the limited service state, or execute the normal service in the state in which the normal service can be executed. If the determining Module 310 determines that the UE 300 is still in the access barred state when the timer times out, the searching module 320 may perform the PLMN search. However, the embodiment of the present invention is not limited thereto.

Optionally, as another embodiment, the searching module 320 is specifically configured to perform the PLMN search by using a manner in which a shortest PLMN search period is used as a start point and a PLMN search period is gradually extended, where the shortest PLMN search period is shorter than a PLMN search period that is used when the UE 300 can execute a normal service; or the searching module 320 is specifically configured to perform the PLMN search by using a search period shorter than a PLMN search period that is used when the UE 300 can execute a normal service.

Optionally, when the searching module 320 performs the PLMN search by using the manner of gradually extending the PLMN search period, the searching module 320 may further go back to the shortest PLMN search period when the PLMN search period reaches a preset maximum PLMN search period, and perform the PLMN search by using the foregoing manner of gradually increasing the PLMN search period, but the embodiment of the present invention is not limited thereto.

Optionally, as another embodiment, the determining module 310 is specifically configured to: if the UE 300 cannot send a location registration request to the current PLMN, determine that the UE 300 cannot be successfully registered with the current PLMN; or the determining module 310 is specifically configured to: if the current PLMN rejects a location registration request sent by the UE 300, determine that the UE 300 cannot be successfully registered with the current PLMN.

The UE 300 may further include a sending module, configured to send the location registration request to the current PLMN, and correspondingly, if the sending module cannot send the location registration request to the current PLMN, the determining module 310 determines that the UE 300 cannot be successfully registered with the current PLMN, but the embodiment of the present invention is not limited thereto.

Optionally, when the sending module of the UE 300 sends the location registration request to the current PLMN, the UE 300 may further include a receiving module, configured to receive a location registration acceptance message or a location registration rejection message sent by the current PLMN according to the location registration request sent by the sending module; if the receiving module receives the location registration rejection message sent by the current PLMN, the determining module 310 determines that the UE 300 cannot be successfully registered with the current PLMN. However, the embodiment of the present invention is not limited thereto.

Figure 11:
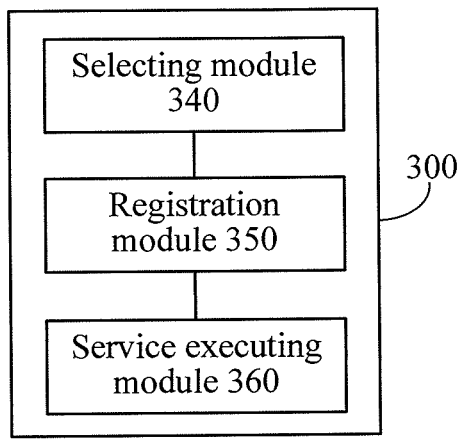
FIG. 11 is yet another schematic block diagram of a user equipment according to an embodiment of the present invention.

Optionally, as another embodiment, as shown in FIG. 11, the UE 300 further includes:

a selecting module 340, configured to select a target PLMN from at least one PLMN found after the searching module 320 performs the PLMN search;

a registration module 350, configured to register with the target PLMN selected by the selecting module 340; and a service executing module 360, configured to execute a normal service in the target PLMN with which the registration module 350 is registered.

The user equipment 300 according to the embodiments of the present invention may be corresponding to the user equipment in the method for searching for a network according to the embodiments of the present invention, and the foregoing and other operations and/or functions of the modules of the user equipment 300 are used to separately implement corresponding processes of the methods in FIG. 1 to FIG. 4. For brevity, details are not described herein again.

Therefore, for the UE according to the embodiments of the present invention, the UE normally camps on the cell of the current PLMN; if the UE determines that the UE is in the access barred state and cannot be successfully registered with the current PLMN, the UE performs the PLMN search, so that when the UE is in the access barred state, the UE can still perform the PLMN search, and can further select a new PLMN for access and execute the normal service, thereby improving user experience. In addition, the search period that is used when the UE performs the PLMN search is shorter than the PLMN search period that is used when the UE can execute the normal service, so that the UE performs the PLMN search more quickly, and can further select a proper PLMN for access more quickly and execute the normal service, thereby further improving the user experience.

Figure 12:
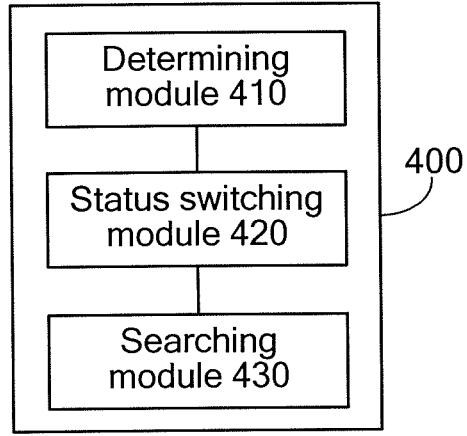
FIG. 12 is a schematic block diagram of a user equipment according to another embodiment of the present invention.

FIG. 12 shows a schematic block diagram of a user equipment UE 400 according to another embodiment of the present invention, where the UE 400 camps on a cell of a current public land mobile network PLMN. As shown in FIG. 12, the UE 400 includes:

a determining module 410, configured to determine that the UE 400 is in an access barred state;

a status switching module 420, configured to switch to a limited service state on the basis that the determining module 410 determines that the UE 400 is in the access barred state; and a searching module 430, configured to perform a PLMN search if the status switching module 420 switches to the limited service state.

Therefore, for the user equipment UE according to the embodiment of the present invention, the UE normally camps on the cell of the current PLMN; if the UE determines that the UE is in the access barred state, the UE switches to the limited service state and performs the PLMN search in the limited service state, so that when the UE is in the access barred state, the UE can perform the PLMN search, and can further select a new PLMN for access and execute a normal service, thereby improving user experience.

Optionally, the determining module 410 is further configured to: before the status switching module 420 switches the UE 400 to the limited service state, determine that the current PLMN is not a home public land mobile network HPLMN of the UE 400 and the current PLMN is not an equivalent home public land mobile network EHPLMN of the UE 400, and determine that the UE 400 is not in a normal roaming state; and the status switching module 420 is further configured to: if the determining module 410 determines that the current PLMN is neither the HPLMN of the UE 400 nor the EHPLMN of the UE 400 and the UE 400 is not in the normal roaming state, switch to the limited service state.

Optionally, as another embodiment, the determining module 410 is specifically configured to determine that the UE 400 is not in the normal roaming state if at least one of the following cases exists: The UE 400 cannot be successfully registered with the current PLMN, the current PLMN is not a registered public land mobile network RPLMN with which the UE 400 is previously successfully registered, a PLMN selector list of the UE 400 does not include the current PLMN, the UE 400 is not in a roaming state, roaming configuration information of the UE 400 does not include information about the current PLMN, or a network type of the current PLMN is not a type of a network in which the UE 400 can normally roam.

Figure 13:
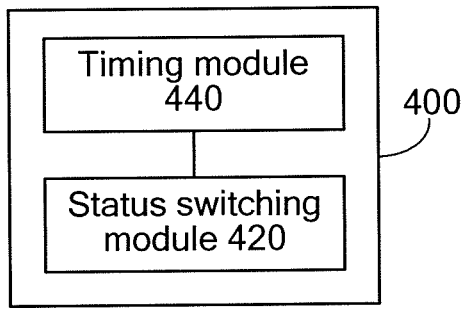
FIG. 13 is another schematic block diagram of a user equipment according to another embodiment of the present invention.

Optionally, as another embodiment, as shown in FIG. 13, the UE 400 further includes:

a timing module 440, configured to start a timer before the status switching module 420 switches to the limited service state; and correspondingly, the status switching module 420 is specifically configured to: if the timer started by the timing module 440 times out and the UE 400 is still in the access barred state, switch to the limited service state.

The UE 400 may further include a receiving module, configured to receive a system message broadcast by the current PLMN. The determining module 410 may determine whether the UE is still in the access barred state according to the system message received by the receiving module. If the determining module 410 determines that the UE 400 has not been in the access barred state before the timer times out, for example, the UE 400 has switched to a state in which a normal service can be executed or has switched to the limited service state, the UE 400 may perform the PLMN search in the limited service state, or execute the normal service in the state in which the normal service can be executed. If the determining module 410 determines that the UE 400 is still in the access barred state when the timer times out, the status switching module 420 may switch the UE 400 to the limited service state. However, the embodiment of the present invention is not limited thereto.

Optionally, as another embodiment, the searching module 430 is specifically configured to perform the PLMN search by using a manner in which a shortest PLMN search period is used as a start point and a PLMN search period is gradually extended, where the shortest PLMN search period is shorter than a PLMN search period that is used when the UE 400 can execute a normal service; or the searching module 430 is specifically configured to perform the PLMN search by using a search period shorter than a PLMN search period that is used when the UE 400 can execute a normal service.

Optionally, when the searching module 430 performs the PLMN search by using the manner of gradually extending the PLMN search period, the searching module 430 may further go back to the shortest PLMN search period when the PLMN search period reaches a preset maximum PLMN search period, and perform the PLMN search by using the foregoing manner of gradually increasing the PLMN search period, but the embodiment of the present invention is not limited thereto.

Figure 14:
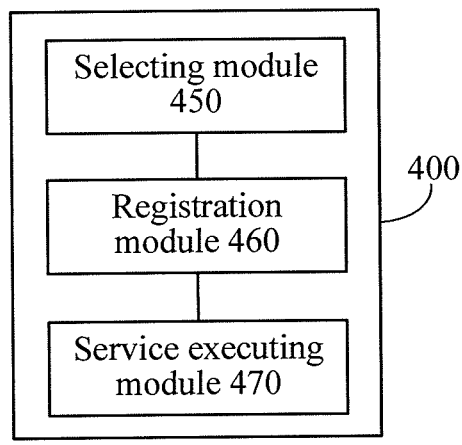
FIG. 14 is yet another schematic block diagram of a user equipment according to another embodiment of the present invention.

Optionally, as another embodiment, as shown in FIG. 14, the UE 400 further includes:

a selecting module 450, configured to select a target PLMN from at least one PLMN found after the searching module 430 performs the PLMN search;

a registration module 460, configured to register with the target PLMN selected by the selecting module 450; and a service executing module 470, configured to execute a normal service in the target PLMN with which the registration module 460 registers.

The user equipment 400 according to the embodiments of the present invention may be corresponding to the user equipment in the method for searching for a network according to the embodiments of the present invention, and the foregoing and other operations and/or functions of the modules of the user equipment 400 are used to separately implement corresponding processes of the methods in FIG. 5 to FIG. 8. For brevity, details are not described herein again.

Therefore, for the user equipment UE according to the embodiments of the present invention, the UE normally camps on the cell of the current PLMN; if the UE determines that the UE is in the access barred state, the UE switches to the limited service state and performs the PLMN search in the limited service state, so that when the UE is in the access barred state, the UE can perform the PLMN search, and can further select a new PLMN for access and execute the normal service, thereby improving user experience. In addition, the search period that is used when the UE performs the PLMN search is shorter than the PLMN search period that is used when the UE can execute the normal service, so that the UE performs the PLMN search more quickly, and can further select a proper PLMN for access more quickly and execute the normal service, thereby further improving the user experience.

Figure 15:
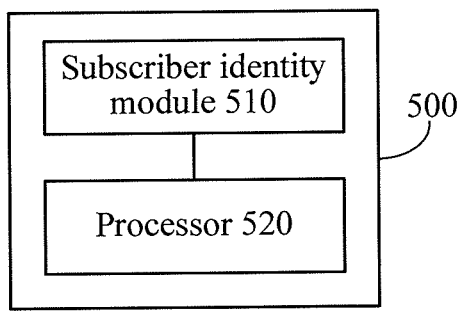
FIG. 15 is a schematic block diagram of a terminal device according to an embodiment of the present invention.

FIG. 15 shows a schematic block diagram of a terminal device 500 according to an embodiment of the present invention, where the terminal device 500 camps on a cell of a current public land mobile network PLMN. As shown in FIG. 15, the terminal device 500 includes:

a subscriber identity module 510, configured to store an access control class ACC of the terminal device 500; and a processor 520, configured to determine that the terminal device 500 is in an access barred state according to system information of the current PLMN and the ACC of the terminal device 500 stored in the subscriber identity module 510, where the processor 520 is further configured to determine that the terminal device 500 cannot be successfully registered with the current PLMN, and perform a PLMN search.

Therefore, for the terminal device according to the embodiment of the present invention, the terminal device normally camps on the cell of the current PLMN; if the terminal device determines that the terminal device is in the access barred state and cannot be successfully registered with the current PLMN, the terminal device performs the PLMN search, so that when the terminal device is in the access barred state, the terminal device can still perform the PLMN search, and can further select a new PLMN for access and execute a normal service, thereby improving user experience.

Optionally, the subscriber identity module 510 may be a subscriber identity module (Subscriber Identity Module, "SIM" for short) or a universal subscriber identity module (Universal Subscriber Identity Module, "USIM" for short), where the subscriber identity module 510 may be implemented by means of hardware, and may also be implemented by means of software, which is not limited in the embodiment of the present invention.

If the processor 520 determines that the terminal device 500 is in the access barred state, the processor 520 further determines whether the terminal device 500 can be successfully registered with the current PLMN. If the processor determines that the terminal device can be successfully registered with the current PLMN, the processor performs the PLMN search.

It should be understood that, in the embodiment of the present invention, the processor 520 may be a central processing unit (Central Processing Unit, "CPU" for short), and the processor 520 may be further another general-purpose processor, a digital signal processor (DSP), an application-specific integrated circuit (ASIC), a field programmable gate array (FPGA), or another programmable logic device, a discrete gate or transistor logic device, a discrete hardware component, or the like. The general-purpose processor may be a microprocessor, or the processor may also be any common processor or the like.

In an implementation process, the steps of the foregoing method may be completed by using a hardware integrated logic circuit in the processor 520 or completed by using an instruction in a software manner. The steps of the method disclosed with reference to the embodiments of the present invention may be implemented by a hardware processor, or implemented by using a combination of hardware in the processor and a software module. The software module may be located in a mature storage medium in the field, such as a random access memory, a flash memory, a read-only memory, a programmable read-only memory, an electrically erasable programmable memory, or a register. To avoid repetition, details are not described herein again.

In the embodiment of the present invention, if the processor 520 determines that the terminal device 500 is in the access barred state and determines that the terminal device 500 cannot be successfully registered with the current PLMN, the processor 520 performs the PLMN search. The processor 520 may determine, according to access control information included in system information of the current PLMN and the ACC stored in the subscriber identity module 510, whether access is allowed by the current PLMN for an AAC to which the terminal device 500 belongs, so as to determine whether the terminal device 500 is in the access barred state. Specifically, if the access is allowed by the current PLMN for the ACC to which the terminal device 500 belongs, the processor 520 may determine that the terminal device 500 is in an access non-barred state; otherwise, the processor 520 may determine that the terminal device 500 is in the access barred state. However, the embodiment of the present invention is not limited thereto.

Optionally, the processor 520 is further configured to:

before performing the PLMN search, determine whether the current PLMN is a normal PLMN, where the normal PLMN includes: a registered public land mobile network RPLMN with which the terminal device 500 is previously successfully registered, a home public land mobile network HPLMN of the terminal device 500 or an equivalent home public land mobile network EHPLMN of the terminal device 500; and if it is determined that the current PLMN is not the normal PLMN, perform the PLMN search.

The terminal device may store the RPLMN with which the terminal device 500 is previously successfully registered in the subscriber identity module 510, where the RPLMN may refer to all PLMNs with which the terminal device 500 is successfully registered in a recent period of time, may include a PLMN with which the terminal device 500 is successfully registered last time, and may further include a PLMN with which the terminal device 500 is successfully registered at an earlier time, but the embodiment of the present invention is not limited thereto.

Optionally, as another embodiment, the processor 520 is further configured to:

start a timer before performing the PLMN search; and if the timer times out and the terminal device 500 is still in the access barred state, perform the PLMN search.

The terminal device 500 may further include a transceiver 530, configured to receive a system message broadcast by the current PLMN. The processor 520 may determine whether the terminal device 500 is still in the access barred state according to the system message received by the transceiver 530. If the processor 520 determines that the terminal device 500 has not been in the access barred state before the timer times out, for example, the terminal device 500 has switched to a state in which a normal service can be executed or has switched to a limited service state, the terminal device 500 may perform the PLMN search in the limited service state, or execute the normal service in the state in which the normal service can be executed. If the processor 520 determines that the terminal device 500 is still in the access barred state when the timer times out, the processor 520 may switch the terminal device 500 to the limited service state. However, the embodiment of the present invention is not limited thereto.

Optionally, as another embodiment, the processor 520 is specifically configured to perform the PLMN search by using a manner in which a shortest PLMN search period is used as a start point and a PLMN search period is gradually extended, where the shortest PLMN search period is shorter than a PLMN search period that is used when the terminal device 500 can execute a normal service; or the processor 520 is specifically configured to perform the PLMN search by using a search period shorter than a PLMN search period that is used when the terminal device 500 can execute a normal service.

Optionally, when the processor 520 performs the PLMN search by using the manner of gradually extending the PLMN search period, the processor 520 may further go back to the shortest PLMN search period when the PLMN search period reaches a preset maximum PLMN search period, and perform the PLMN search by using the foregoing manner of gradually increasing the PLMN search period, but the embodiment of the present invention is not limited thereto.

Optionally, as another embodiment, the processor 520 is specifically configured to: if the terminal device 500 cannot send a location registration request to the current PLMN, determine that the terminal device 500 cannot be successfully registered with the current PLMN; or the processor 520 is specifically configured to: if the current PLMN rejects a location registration request sent by the terminal device 500, determine that the terminal device 500 cannot be successfully registered with the current PLMN.

The terminal device 500 may further include a transceiver 530, configured to send the location registration request to the current PLMN, and correspondingly, if the transceiver 530 cannot send the location registration request to the current PLMN, the processor 520 determines that the terminal device 500 cannot be successfully registered with the current PLMN, but the embodiment of the present invention is not limited thereto.

Optionally, when the transceiver 530 of the terminal device 500 sends the location registration request to the current PLMN, the transceiver 530 may be further configured to receive a location registration acceptance message or a location registration rejection message sent by the current PLMN according to the location registration request; if the transceiver 530 receives the location registration rejection message sent by the current PLMN, the processor 520 determines that the terminal device 500 cannot be successfully registered with the current PLMN. However, the embodiment of the present invention is not limited thereto.

Optionally, as another embodiment, the processor 520 is further configured to: select a target PLMN from at least one PLMN found after performing the PLMN search; register with the target PLMN; and execute a normal service in the target PLMN.

The terminal device 500 according to the embodiments of the present invention may be corresponding to the UE in the method for searching for a network according to the embodiments of the present invention, and the foregoing and other operations and/or functions of the modules of the terminal device 500 are used to separately implement corresponding processes of the methods in FIG. 1 to FIG. 4. For brevity, details are not described herein again.

Therefore, for the terminal device according to the embodiments of the present invention, the terminal device normally camps on the cell of the current PLMN; if the terminal device determines that the terminal device is in the access barred state and cannot be successfully registered with the current PLMN, the terminal device performs the PLMN search, so that when the terminal device is in the access barred state, the terminal device can still perform the PLMN search, and can further select a new PLMN for access and execute the normal service, thereby improving user experience. In addition, the search period that is used when the terminal device performs the PLMN search is shorter than the PLMN search period that is used when the terminal device can execute the normal service, so that the terminal device performs the PLMN search more quickly, and can further select a proper PLMN for access more quickly and execute the normal service, thereby further improving user experience.

Figure 16:
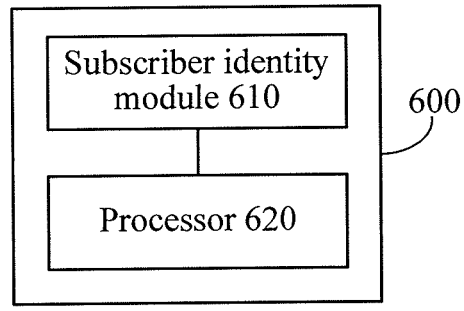
FIG. 16 is a schematic block diagram of a terminal device according to another embodiment of the present invention.

FIG. 16 shows a schematic block diagram of a terminal device 600 according to another embodiment of the present invention, where the terminal device 600 camps on a cell of a current public land mobile network PLMN. As shown in FIG. 16, the terminal device 600 includes:

a subscriber identity module 610, configured to store an access control class ACC of the terminal device 600; and a processor 620, configured to determine that the terminal device 600 is in an access barred state according to system information of the current PLMN and the ACC of the terminal device 600 stored in the subscriber identity module 610, where the processor 620 is further configured to switch to a limited service state, and perform a PLMN search.

Therefore, for the terminal device according to the embodiment of the present invention, the terminal device normally camps on the cell of the current PLMN; if the terminal device determines that the terminal device is in the access barred state, the terminal device switches to the limited service state and performs the PLMN search in the limited service state, so that when the terminal device is in the access barred state, the terminal device can perform the PLMN search, and can further select a new PLMN for access and execute a normal service, thereby improving user experience.

Optionally, the subscriber identity module 610 may be a subscriber identity module (Subscriber Identity Module, "SIM" for short) or a universal subscriber identity module (Universal Subscriber Identity Module, "USIM" for short), where the subscriber identity module 610 may be implemented by means of hardware, and may also be implemented by means of software, which is not limited in the embodiment of the present invention.

If the processor 620 determines that the terminal device 600 is in the access barred state, the processor 620 switches to the limited service state, and performs the PLMN search in the limited service state.

It should be understood that, in the embodiment of the present invention, the processor 620 may be a central processing unit (Central Processing Unit, "CPU" for short), and the processor 620 may be further another general-purpose processor, a digital signal processor (DSP), an application-specific integrated circuit (ASIC), a field programmable gate array (FPGA), or another programmable logic device, a discrete gate or transistor logic device, a discrete hardware component, or the like. The general-purpose processor may be a microprocessor, or the processor may also be any common processor or the like.

In an implementation process, the steps of the foregoing method may be completed by using a hardware integrated logic circuit in the processor 620 or completed by using an instruction in a software manner. The steps of the method disclosed with reference to the embodiments of the present invention may be implemented by a hardware processor, or implemented by using a combination of hardware in the processor and a software module. The software module may be located in a mature storage medium in the field, such as a random access memory, a flash memory, a read-only memory, a programmable read-only memory, an electrically erasable programmable memory, or a register. To avoid repetition, details are not described herein again.

In the embodiment of the present invention, the processor 620 may determine, according to access control information included in system information of the current PLMN and the ACC stored in the subscriber identity module 610, whether access is allowed by the current PLMN for an AAC to which the terminal device 600 belongs, so as to determine whether the terminal device 600 is in the access barred state. Specifically, if the access is allowed by the current PLMN for the ACC to which the terminal device 600 belongs, the processor 610 may determine that the terminal device 600 is in an access non-barred state; otherwise, the processor 620 may determine that the terminal device 600 is in the access barred state. However, the embodiment of the present invention is not limited thereto.

Optionally, the processor 620 is further configured to:

before switching to the limited service state, determine that the current PLMN is not a home public land mobile network HPLMN of the terminal device 600 and the current PLMN is not an equivalent home public land mobile network EHPLMN of the terminal device 600, and determine that the terminal device 600 is not in a normal roaming state; and if the current PLMN is neither the HPLMN of the terminal device 600 nor the EHPLMN of the terminal device 600, and the terminal device 600 is not in the normal roaming state, switch to the limited service state.

Optionally, as another embodiment, the processor 620 is specifically configured to determine that the terminal device 600 is not in the normal roaming state if at least one of the following cases exists: The terminal device 600 cannot be successfully registered with the current PLMN, the current PLMN is not a registered public land mobile network RPLMN with which the terminal device 600 is previously successfully registered, a PLMN selector list of the terminal device 600 does not include the current PLMN, the terminal device 600 is not in a roaming state, roaming configuration information of the terminal device 600 does not include information about the current PLMN, or a network type of the current PLMN is not a type of a network in which the terminal device 600 can normally roam.

Optionally, as another embodiment, the processor 620 is further configured to:

start a timer before switching to the limited service state; and if the timer times out and the terminal device 600 is still in the access barred state, switch to the limited service state.

The terminal device 600 may further include a transceiver 630, configured to receive a system message broadcast by the current PLMN. The processor 620 may determine whether the terminal device 600 is still in the access barred state according to the system message received by the transceiver 630. If the processor 620 determines that the terminal device 600 has not been in the access barred state before the timer times out, for example, the terminal device 600 has switched to a state in which a normal service can be executed or has switched to the limited service state, the terminal device 600 may perform the PLMN search in the limited service state, or execute the normal service in the state in which the normal service can be executed. If the processor 620 determines that the terminal device 600 is still in the access barred state when the timer times out, the processor 620 may switch the terminal device 600 to the limited service state. However, the embodiment of the present invention is not limited thereto.

Optionally, as another embodiment, the processor 620 is specifically configured to perform the PLMN search by using a manner in which a shortest PLMN search period is used as a start point and a PLMN search period is gradually extended, where the shortest PLMN search period is shorter than a PLMN search period that is used when the terminal device 600 can execute a normal service; or the processor 620 is specifically configured to perform the PLMN search by using a search period shorter than a PLMN search period that is used when the terminal device 600 can execute a normal service.

Optionally, when the processor 620 performs the PLMN search by using the manner of gradually extending the PLMN search period, the processor 620 may further go back to the shortest PLMN search period when the PLMN search period reaches a preset maximum PLMN search period, and perform the PLMN search by using the foregoing manner of gradually increasing the PLMN search period, but the embodiment of the present invention is not limited thereto.

Optionally, as another embodiment, the processor 620 is further configured to:

select a target PLMN from at least one PLMN found after performing the PLMN search; register with the target PLMN; and execute a normal service in the target PLMN.

The terminal device 600 according to the embodiments of the present invention may be corresponding to the UE in the method for searching for a network according to the embodiments of the present invention, and the foregoing and other operations and/or functions of the modules of the terminal device 600 are used to separately implement corresponding processes of the methods in FIG. 5 to FIG. 8. For brevity, details are not described herein again.

Therefore, for the terminal device according to the embodiments of the present invention, the terminal device normally camps on the cell of the current PLMN; if the terminal device determines that the terminal device is in the access barred state, the terminal device switches to the limited service state and performs the PLMN search in the limited service state, so that when the terminal device is in the access barred state, the terminal device can perform the PLMN search, and can further select a new PLMN for access and execute the normal service, thereby improving user experience. In addition, the search period that is used when the terminal device performs the PLMN search is shorter than the PLMN search period that is used when the terminal device can execute the normal service, so that the terminal device performs the PLMN search more quickly, and can further select a proper PLMN for access more quickly and execute the normal service, thereby further improving the user experience.

It should be understood that the term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for searching for a network, the method comprising:
at a user equipment (UE) camping on a cell of a current public land mobile network (PLMN):
in response to determining that the UE is in an access barred state in the camped cell, and that the UE cannot be successfully registered with the current PLMN, determining whether the current PLMN is a normal PLMN, wherein the normal PLMN comprises: a registered public land mobile network (RPLMN) with which the UE is previously successfully registered, a home public land mobile network (HPLMN) of the UE or an equivalent home public land mobile network (EHPLMN) of the UE;
performing a PLMN search in response to the UE determining that the current PLMN is not the normal PLMN; and
reselecting a cell in the current PLMN in response to the UE determining that the current PLMN is the normal PLMN.

2. The method according to claim 1, wherein performing the PLMN search comprises:
performing the PLMN search by using a manner in which a shortest PLMN search period is used as a start point and a PLMN search period is gradually extended, wherein the shortest PLMN search period is shorter than a PLMN search period that is used when the UE can execute a normal service; or
performing the PLMN search by using a search period shorter than a PLMN search period that is used when the UE can execute a normal service.

3. The method according to claim 1, wherein the method further comprises:
if the UE cannot send a location registration request to the current PLMN, determining that the UE cannot be successfully registered with the current PLMN; or
if the current PLMN rejects a location registration request sent by the UE, determining that the UE cannot be successfully registered with the current PLMN.

4. A method for searching for a network, comprising:
in a user equipment (UE) camping on a cell of a current public land mobile network (PLMN):
determining whether the UE is in an access barred state in the camped cell;
in response to the UE being in the access barred state in the camped cell, determining whether the current PLMN is a home public land mobile network HPLMN of the UE, whether the PLMN is an equivalent home public land mobile network EHPLMN of the UE, and whether the UE is in a normal state;
switching to a limited service state and performing a PLMN search if the current PLMN is neither the HPLMN of the UE nor the EHPLMN of the UE, and the UE is not in the normal roaming state; and
reselecting a cell in the current PLMN if the current PLMN is the HPLMN or current PLMN is the EHPLMN, or the UE is in the normal roaming state.

5. The method according to claim 4, wherein performing the PLMN search comprises:
performing the PLMN search by using a manner in which a shortest PLMN search period is used as a start point and a PLMN search period is gradually extended, wherein the shortest PLMN search period is shorter than a PLMN search period that is used when the UE can execute a normal service; or
performing the PLMN search by using a search period shorter than a PLMN search period that is used when the UE can execute a normal service.

6. The method according to claim 4, wherein determining whether the UE is in a normal roaming state comprises:
determining that the UE is not in the normal roaming state if at least one of the following cases exists: the UE cannot be successfully registered with the current PLMN, the current PLMN is not a registered public land mobile network RPLMN with which the UE is previously successfully registered, a PLMN selector list of the UE does not comprise the current PLMN, the UE is not in a roaming state, roaming configuration information of the UE does not comprise information about the current PLMN, or a network type of the current PLMN is not a type of a network in which the UE can normally roam.

7. A terminal device for searching for a network, comprising a processor and a memory storing instructions, the instructions being executable by the processor to cause the terminal device to:
camp on a cell of a current public land mobile network (PLMN);
determine whether the current PLMN is a normal PLMN in response to determining that the terminal device is in an access barred state in the camped cell, and that the terminal device cannot be successfully registered with the current PLMN, wherein the normal PLMN comprises: a registered public land mobile network (RPLMN) with which the terminal device is previously successfully registered, a home public land mobile network (HPLMN) of the terminal device or an equivalent home public land mobile network (EHPLMN) of the terminal device;
perform a PLMN search in response to the terminal device determining that the current PLMN is not the normal PLMN; and
reselect a cell in the current PLMN if the terminal device determines that the current PLMN is the normal PLMN.

8. The terminal device according to claim 7, wherein the instructions are further executable by the processor to cause the terminal device to:
perform the PLMN search by using a manner in which a shortest PLMN search period is used as a start point and a PLMN search period is gradually extended, wherein the shortest PLMN search period is shorter than a PLMN search period that is used when the terminal device can execute a normal service; or
perform the PLMN search by using a search period shorter than a PLMN search period that is used when the terminal device can execute a normal service.

9. The terminal device according to claim 7, wherein the instructions are further executable by the processor to cause the terminal device to:
determine that the terminal device cannot be successfully registered with the current PLMN if the terminal device cannot send a location registration request to the current PLMN; or
determine that the terminal device cannot be successfully registered with the current PLMN if the current PLMN rejects a location registration request sent by the terminal device.

10. A terminal device for searching for a network, comprising a processor and a memory storing instructions, the instructions being executable by the processor to cause the terminal device to:

camp on a cell of a current public land mobile network (PLMN);

determine whether the terminal device is in an access barred state in the camped cell;

in response to the terminal device being in the access barred state in the camped cell, determine whether the current PLMN is a home public land mobile network HPLMN of the terminal device, whether the PLMN is an equivalent home public land mobile network EHPLMN of the terminal device, and whether the terminal device is in a normal state;

switch to a limited service state and perform a PLMN search if the current PLMN is neither the HPLMN of the terminal device nor the EHPLMN of the terminal device, and the terminal device is not in the normal roaming state; and reselect a cell in the current PLMN if the current PLMN is the HPLMN or current PLMN is the EHPLMN, or the terminal device is in the normal roaming state.

11. The terminal device according to claim 10, wherein the instructions are further executable by the processor to cause the terminal device to:

perform the PLMN search by using a manner in which a shortest PLMN search period is used as a start point and a PLMN search period is gradually extended, wherein the shortest PLMN search period is shorter than a PLMN search period that is used when the terminal device can execute a normal service; or perform the PLMN search by using a search period shorter than a PLMN search period that is used when the terminal device can execute a normal service.

12. The terminal device according to claim 10, wherein the instructions are further executable by the processor to cause the terminal device to:

determine that the terminal device is not in the normal roaming state if at least one of the following cases exists: the terminal device cannot be successfully registered with the current PLMN, the current PLMN is not a registered public land mobile network RPLMN with which the terminal device is previously successfully registered, a PLMN selector list of the terminal device does not comprise the current PLMN, the terminal device is not in a roaming state, roaming configuration information of the terminal device does not comprise information about the current PLMN, or a network type of the current PLMN is not a type of a network in which the terminal device can normally roam.

* * * * *